United States Patent Office 3,231,956
Patented Feb. 1, 1966

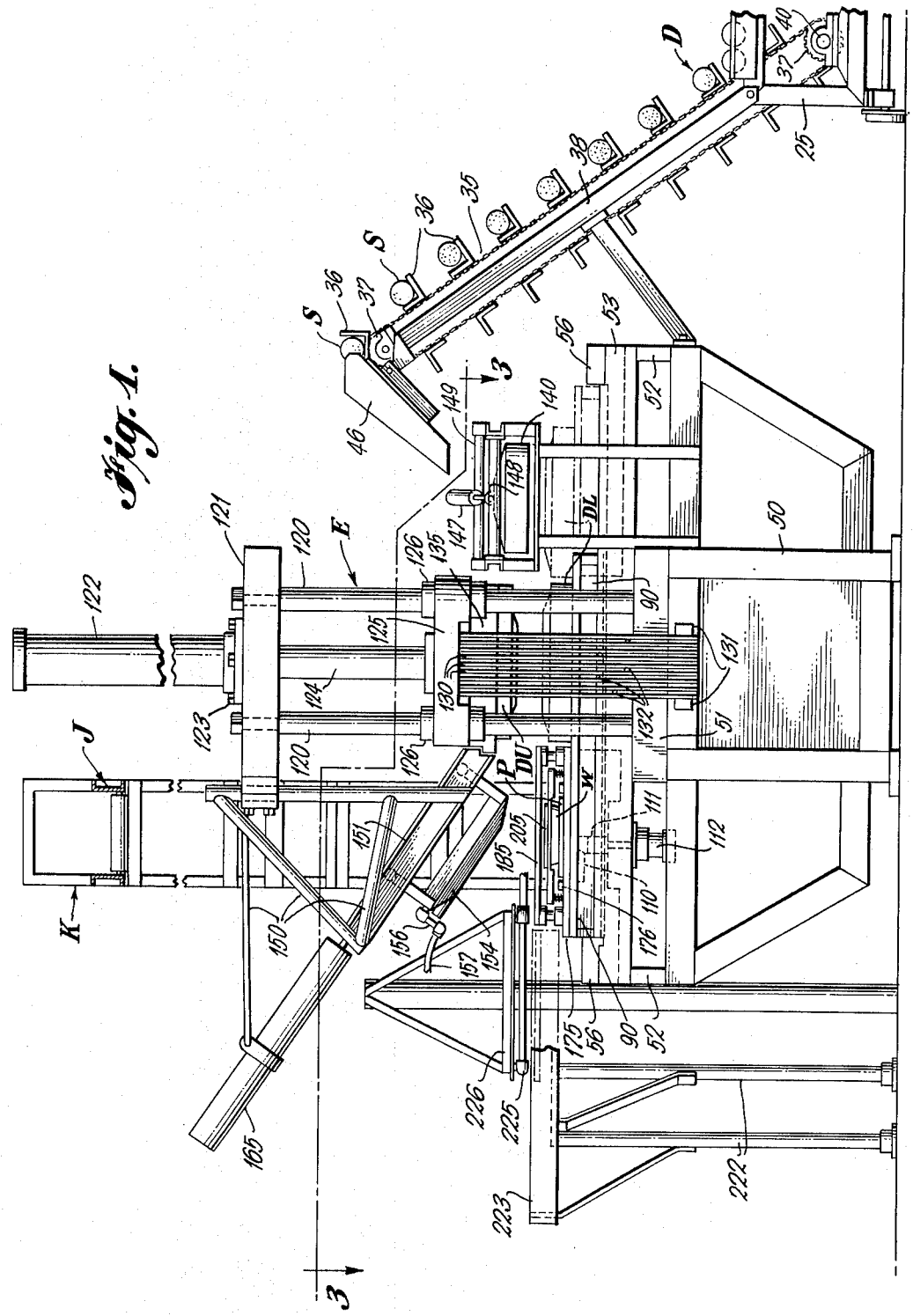

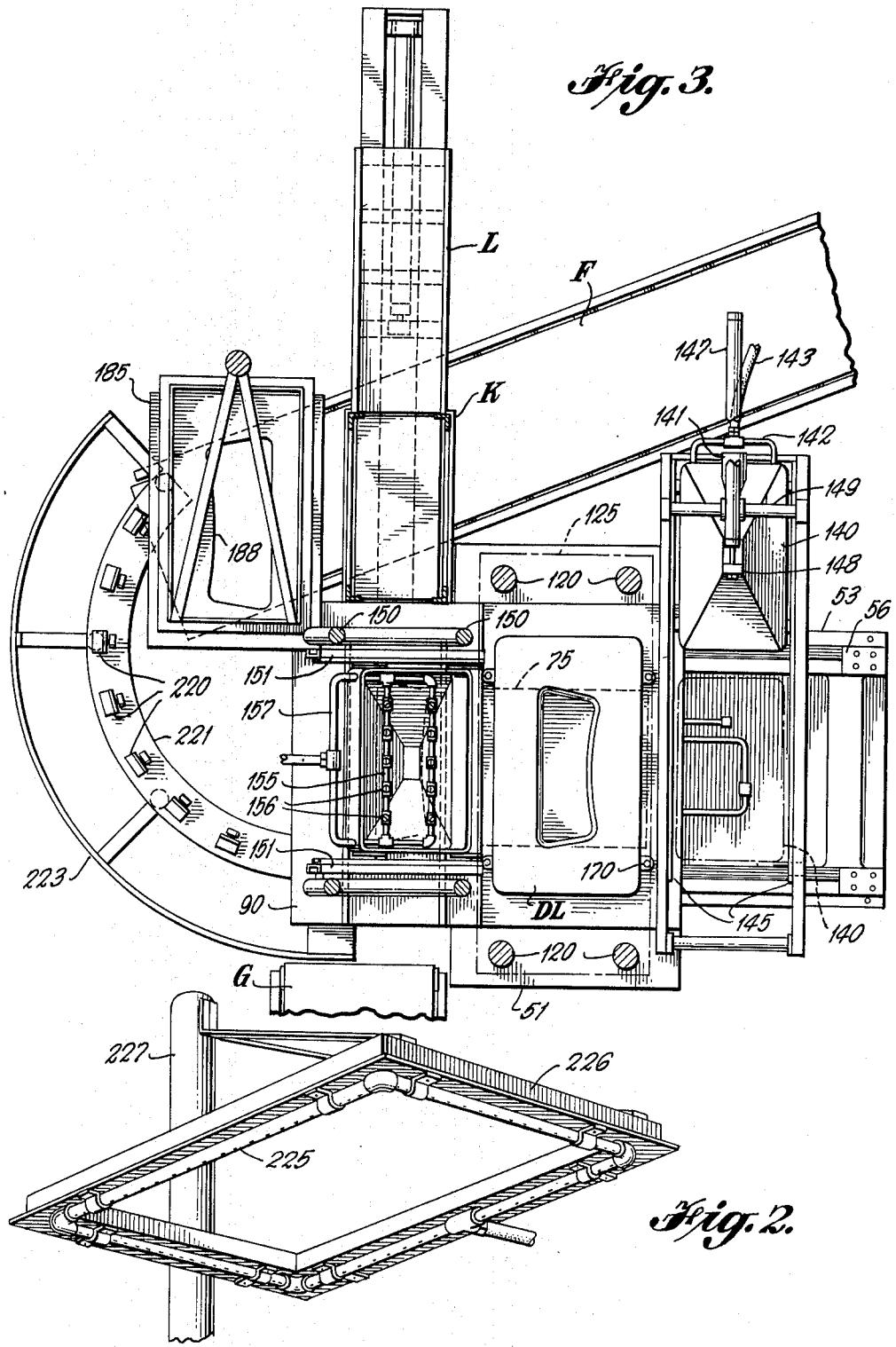

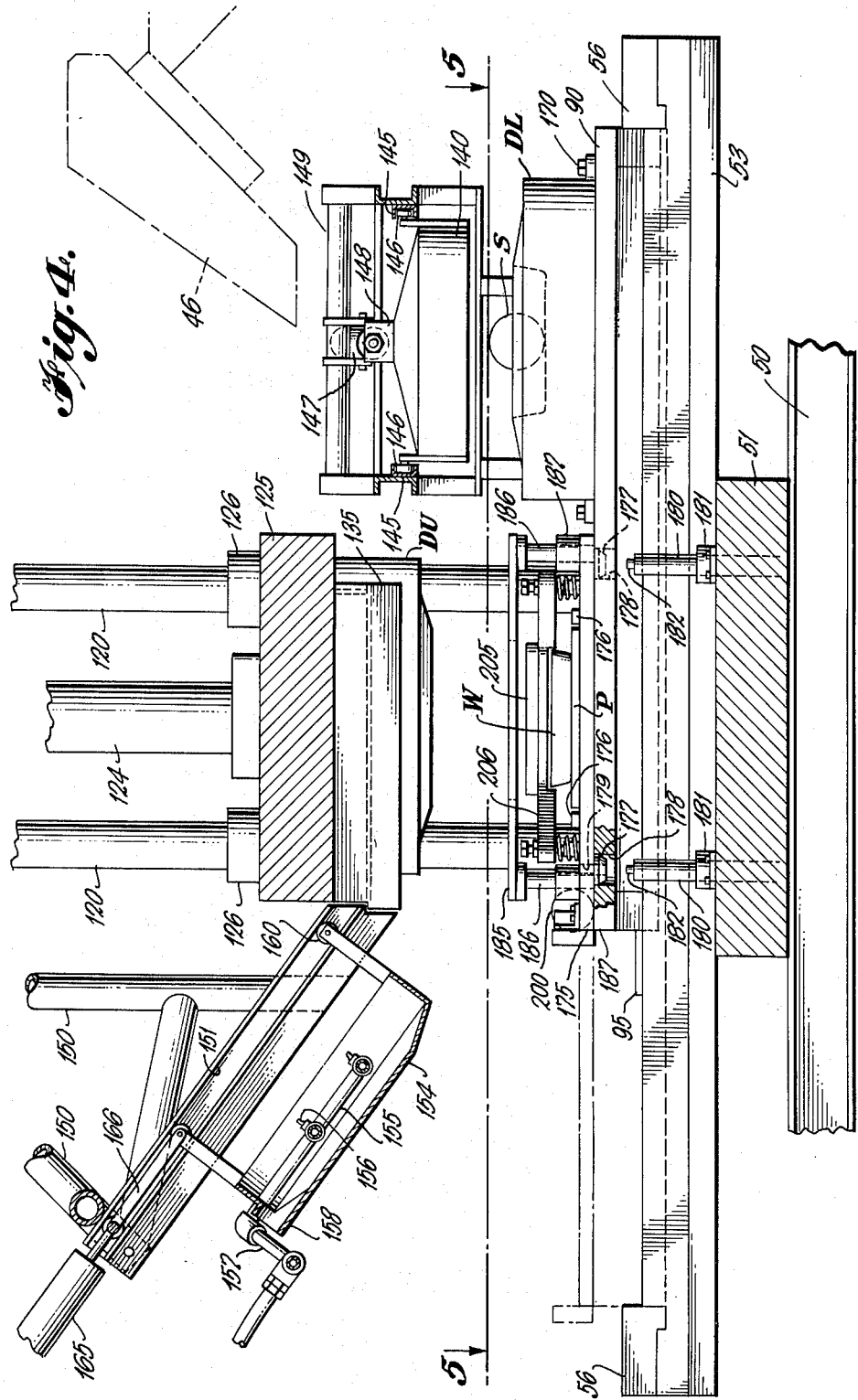

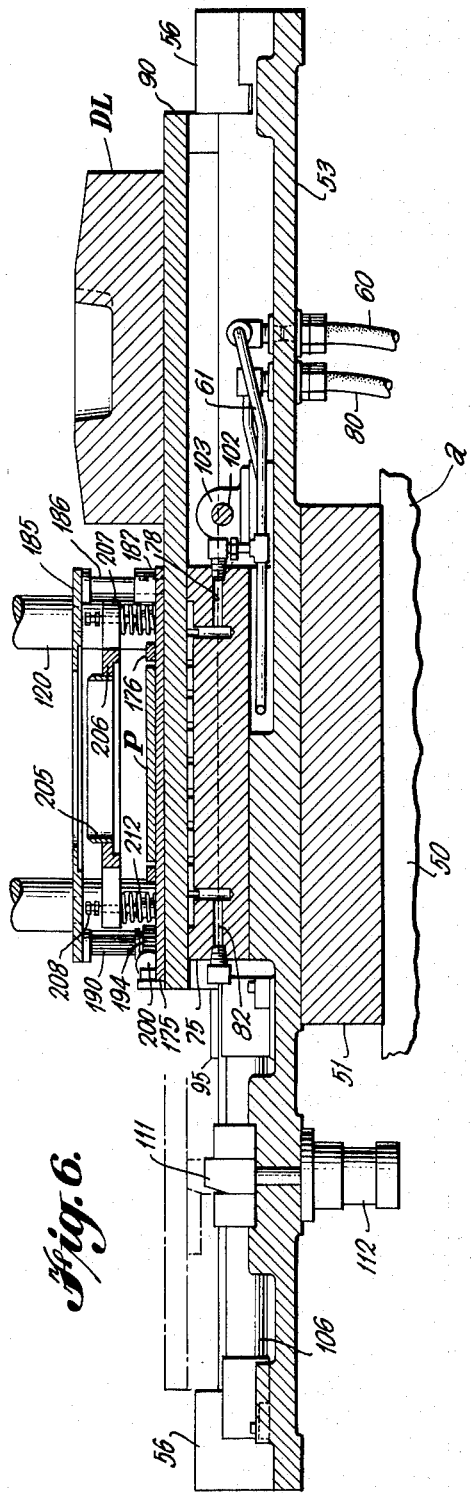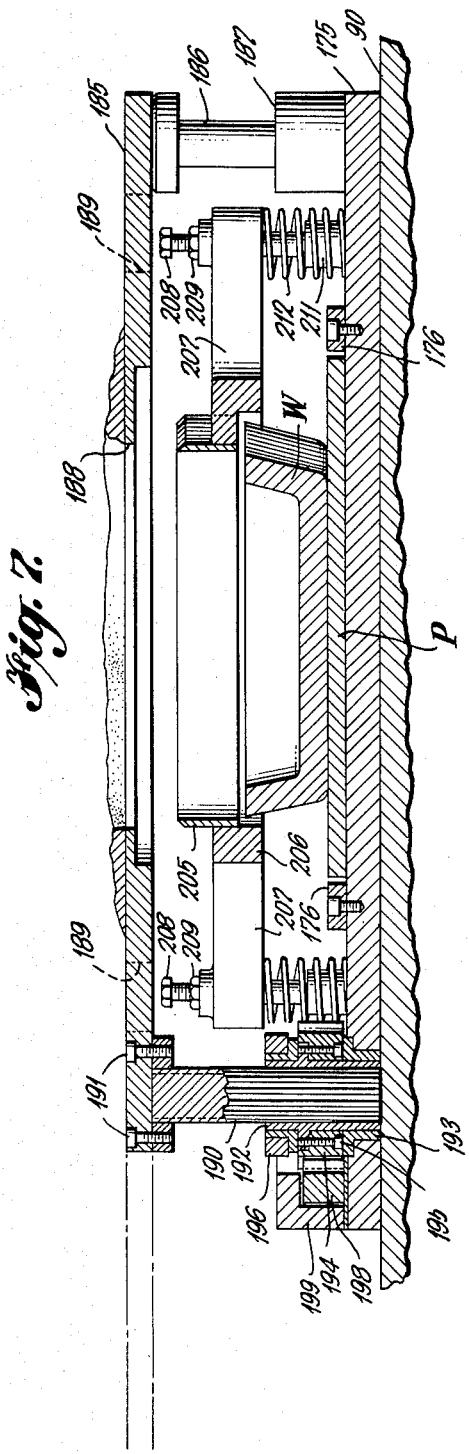

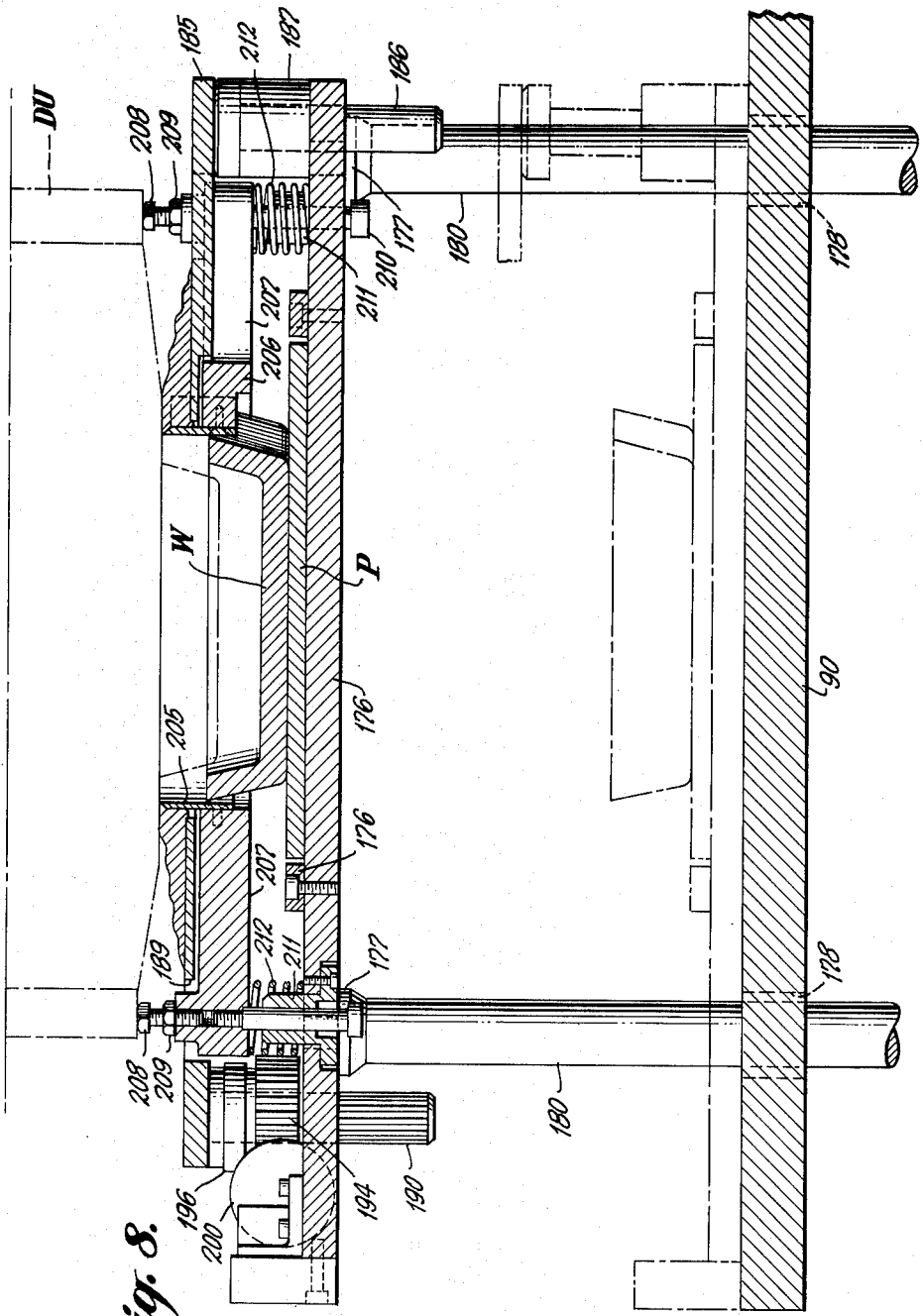

3,231,956
REMOVAL OF SCRAP MATERIAL INCIDENT TO PRESSED WARE PRODUCTION
Donald R. Emmel, Springfield, Ohio, assignor to The Murray Corporation of America, Pittsburgh, Pa., a corporation of Delaware
Filed Aug. 22, 1961, Ser. No. 133,074
10 Claims. (Cl. 25—27)

This invention relates to the art of pressed ware production and particularly such production as employed in the forming of ceramic ware from moldable plastic materials such as clay. More specifically, the invention is directed to a method and apparatus for ware pressing wherein flash material formed in conjunction with pressing ware from a body of moldable plastic material is stripped from the ware and removed as scrap separate from the ware produced in the pressing operation.

The art of ware pressing has advanced to the point where automatic pressing carried out in a single pressing operation may be employed to form the ware in a self-supporting state from a body of plastic material. These advances dictate a continuing need for improving the pressing operation whereby the resulting products will be as near as possible in a finished state when the pressing operation is completed. Since in pressing ware from a body of plastic material a portion of the material is extended outwardly between the dies as flash, this flash must be removed as scrap in finishing the ware article.

A particular method of ware pressing wherein flash material may be formed in producing ware is disclosed in the Blackburn et al. Patent 2,584,109 of February 5, 1952. In use of this method, a pair of porous surfaced dies are employed which together define a ware forming cavity therebetween conforming to the desired configuration of the ware to be produced. A body of plastic material such as clay is pressed between these dies under relatively high pressure such that moisture if present in the material passes into the porous die surfaces. The formed ware is released from the dies by applying fluid pressure such as air under pressure against the ware surface through the porous surfaces of the dies so that upon separation of the dies the formed ware is readily removed therefrom.

The invention herein provides for the expeditious production of pressed ware articles from a body of plastic material to a state ready for finishing and wherein material in excess of that quantity necessary to form the desired ware and which forms as flash surrounding the ware incident to the pressing of the body into the ware shape is stripped from the ware and removed separately as scrap in carrying out the pressing operation. Especially where moisture containing materials such as clay are used in the pressing operation, the removed scrap may be returned to be reused in providing subsequent bodies of material supplied to the pressing operation to effect a further economy in the over-all procedure of ware production.

Thus it is a principal object of the instant invention to provide a method and apparatus for use in the production of pressed ware from plastic materials wherein flash material formed in conjunction with pressing the ware is stripped from the ware and removed as scrap separate from the ware as an incident to the pressing operation.

A further object of the invention is to provide apparatus operable in conjunction with the reciprocable dies of a ware press which cooperates with one of the dies while flash material and ware are supported on the die surface and remove the flash and ware separately from the press.

It is also an object of this invention to provide for use with a ware press having upper and lower dies movable together to press ware from plastic material apparatus including means defining an outline corresponding to the peripheral configuration of the desired ware to be produced and engageable with the upper die to effect separate removal of the flash and ware from the upper die surface.

Another object of the invention is to provide apparatus for separate removal of the flash as scrap material and the ware as defined in the above object wherein means involves a trimming blade which is movable upwardly into engagement with the upper die surface which has the flash and ware retained thereon.

Also an object of the instant invention resides in providing apparatus for use with a ware press wherein presser means are included for separating the flash and desired ware for removal of the flash as scrap and tray means are associated with such presser means to receive the scrap and transport it away from the die of the ware press.

In conjunction with the above object, it is a further object of this invention to provide air blast means for discharging scrap from the tray means preparatory to the tray means being returned to receive further scrap.

The above and other objects and novel features of the instant invention will be apparent from the following description taken in connection with the accompanying drawings. It is to be expressly understood, however, that the drawings are for the purpose of illustration only and are not intended to define the limits of the invention, but rather to merely illustrate a preferred embodiment and structure incorporating the features of the instant invention adapted to produce a particular pressed ware article and suitable for carrying out the method of this invention.

In the drawings wherein like reference characters refer to like parts throughout the several views:

FIGURE 1 is a side elevational view showing the ware press and a portion of a suitable clay slug loader useable therewith.

FIGURE 2 is a perspective view showing the air jet nozzle assembly employed in removing scrap material created incident to operation of the ware press of FIGURE 1.

FIGURE 3 is a horizontal sectional view taken on line 3—3 of FIGURE 1.

FIGURE 4 is a detailed view showing features of the ware press including the press shuttle, scrap and ware removal assembly and die dewatering hoods.

FIGURE 6 is a longitudinal sectional view showing construction details of the press shuttle and scrap and ware removal assembly.

FIGURE 7 is a sectional view taken on line 7—7 of FIGURE 5.

FIGURE 8 is a sectional view taken on line 8—8 of FIGURE 5.

GENERAL DESCRIPTION OF APPARATUS

Figure 5:
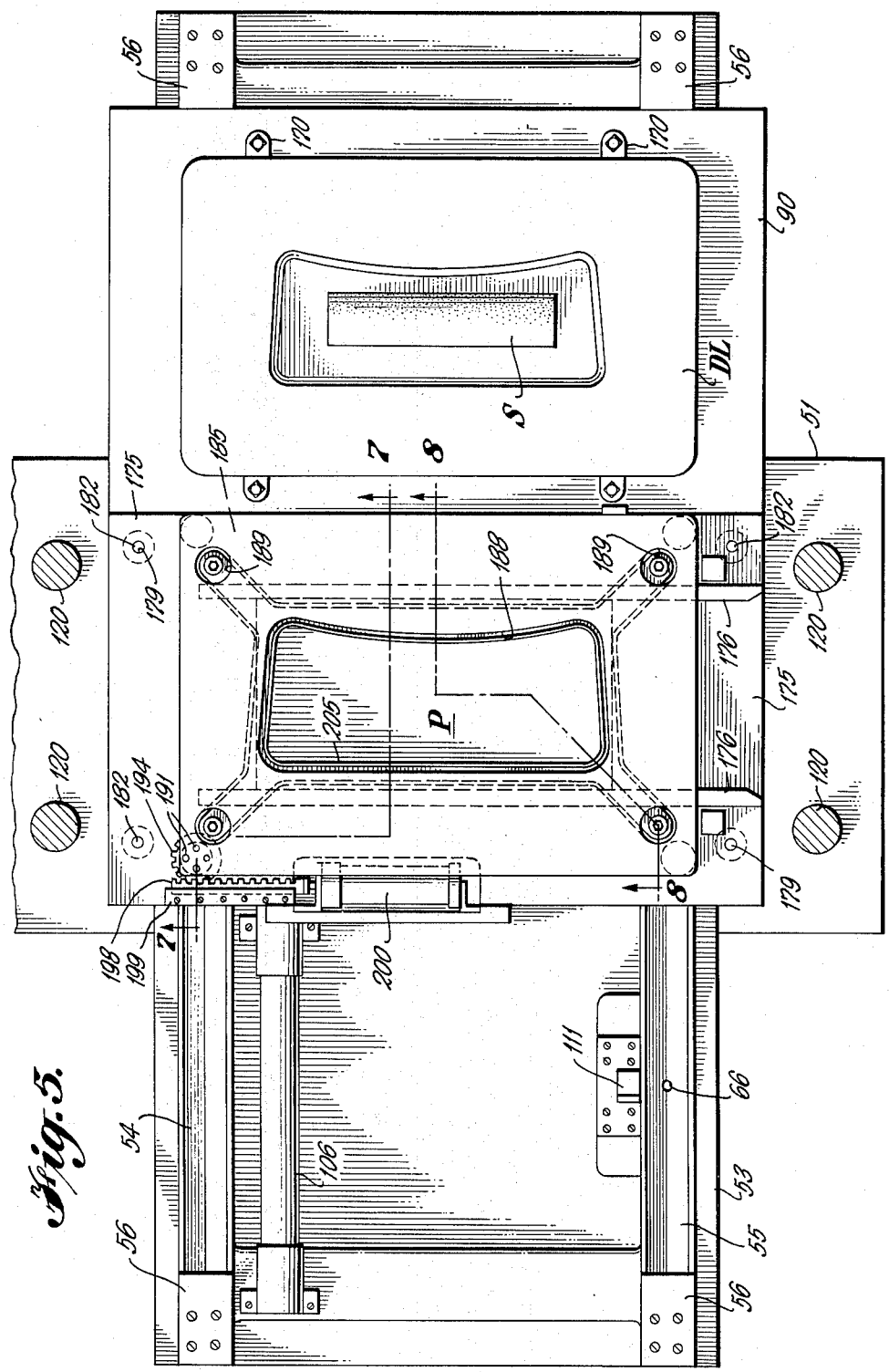
FIGURE 5 is a view taken generally on line 5—5 of FIGURE 4.

Before turning to a detailed description of the specific structural details embodied in the scrap removal assembly incorporated in the pressed ware producing apparatus, a general description of the components and features of the apparatus may best be given. In this respect, primary reference will be made to FIGURE 1. It may be further pointed out that as to certain features and equipment associated with the ware press which, although partially illustrated on the drawings herein, do not form a part of the instant invention, a full description and illustration thereof may be found in application Serial No. 116,135, filed June 9, 1961.

For purposes of illustration and in the specific description of one adaptation of the ware producing apparatus of this invention, the embodiment shown on the drawings will be described in connection with the production of a particular pressed ware article, namely, a toilet tank cover. Such cover is produced by the apparatus starting with moist clay raw material and continuing through production of the tank cover in a self-supporting condition ready for final drying, finish trimming, glazing and firing. It is to be expressly understood that the particular adaptation of the apparatus to produce a tank cover and the utilization of moist clay as the raw starting material are only specific examples of pressed ware and raw materials which may be produced and employed in making use of the inventive features of the instant invention. Thus, an almost infinite variety of pressed ware articles may be produced with the apparatus depending primarily on the configuration of the die cavity formed between the mating dies used on the ware press. Also, a variety of different raw materials in a plastic state may be used in the apparatus to form pressed ware articles.

In the specific adaptation of the scrap removal assembly as incorporated in the ware press, solid cylindrical lengths of clay, hereinafter referred to as clay slugs S, are fed to the press with each clay slug containing the proper amount of clay necessary to form the particular ware shape to be produced which in the illustrated embodiment is a toilet tank cover. The clay slugs are disposed on a clay slug loader D in parallel arrangement and are fed by the loader one by one in timed sequence with the ware press operation by passing up the inclined loader conveyor and dropping in succession from the upper end of the loader conveyor through a loading chute to load the lower die on the ware press.

The ware press is generally designated at E on FIGURE 1. This press E provides a pair of porous dies DL and DU which are employed to press the ware, i.e., a toilet tank cover as illustrated, from the clay slug S. In the press E, the lower die DL is mounted on a reciprocable shuttle so that this lower die may be shuttled between a loading position whereat it is disposed generally beneath the loading chute and a pressing position whereat the lower die DL is aligned beneath the upper die DU carried on the underside of the vertically reciprocable press platen.

The press E also includes a first dewatering hood mounted to be horizontally reciprocable in a path extending transversely above the loading position of the lower die DL so that the hood can overlie the lower die when such die is disposed in loading position and cooperate with such die to remove moisture from the surface of the lower die between ware pressing operations where a moisture containing plastic material is being used in the pressing operations. A second dewatering hood is mounted to permit it to be moved from the position shown in FIGURE 1 down beneath the upper die DU for removing moisture from the surface of the upper die after the article has been pressed.

A pallet supporting platform which functions to receive and manipulate individual pallets P for the pressed ware W, once the ware is removed from the upper die, is also carried on the press shuttle. The positioning of the pallet supporting platform on the shuttle is such that when the lower die DL is disposed at the loading position, the pallet supporting platform will be located beneath the upper die DU. Likewise, when the shuttle is shifted to carry the lower die DL to a position aligned beneath the upper die DU, the pallet supporting platform and pallet P carried thereby will be disposed in the position as shown in FIGURE 1.

A ware trimming blade is mounted above the pallet supporting platform and a scrap removing tray mounted to be swingable above the pallet supporting platform, the trimming blade and the pallet P. The trimming blade has an opening conforming in outline to the configuration of the tank cover ware W to be produced. The scrap tray is swingable to a position whereat it lies beneath an air jet nozzle manifold (FIGURE 2) by means of which air jets are directed against the scrap on the tray to blow the scrap through the tray opening. Thereupon the scrap falls onto a suitable conveyor F which carries the scrap back to the pug mill A to be reworked and incorporated with clay as it is fed into the deairing extruder B.

The pallet P collects the pressed ware W as it is released from the underside of the upper die DU and facilitates handling of the ware in removing it from the press and passing it to the ware finishing operations. Thus, after the ware W has been released onto an empty pallet P on the pallet supporting platform, the shuttle is shifted to position the ware carrying pallet P as shown in FIGURE 1. The pallet with the formed ware W thereon is pushed from the press by feeding an empty pallet whereupon the ware carrying pallet P is transferred to a conveyor G for removal from the press for further processing.

GENERAL OPERATION OF WARE PRESS

The clay slugs S on slug loader D are conveyed upwardly to be discharged from the loader through the loading chute onto the lower die DL on ware press E. Of course, the press shuttle is disposed at this time with die DL in loading position to receive the slug S.

In its loaded condition, the lower die DL has a clay slug S generally centered thereon as the slug is received from the slug loader D through the loading chute. Thereupon, the shuttle is shifted and locked in place to dispose the lower die DL beneath the upper porous die DU carried on the ware press platen. The upper die DU is then lowered to press the slug S into the form of the cavity defined between the upper and lower dies.

The ware pressing operation generally employs the teachings of the ware pressing process described in Blackburn et al. Patent 2,584,109 of February 5, 1952. In this process a pair of porous surfaced dies made of a permeable plaster material are used and in the pressing action moisture is pressed from the clay and absorbed by the porous faces of the dies. The ware becomes adhered to the faces of both the upper and lower dies as a result of the pressing action carried out in forming the ware. However, the porosity of the dies enables releasing the ware from the die faces by applying fluid pressure such as air under pressure through the faces of the dies.

Following the teachings of the above-mentioned patent, in the instant invention, releasing fluid pressure is applied across the face of the lower die DL immediately prior to separating the dies DL and DU. Thus, the formed ware is released from the surface of the lower die DL and as the dies part the ware remains adhered to the face of the upper die DU.

During the aforementioned operations, the pallet feeder L will have pushed an empty pallet P as received from pallet lowering device K to dispose this empty pallet on the pallet supporting platform. The scrap tray will be positioned as shown in FIGURE 1 so that the opening therein is aligned above the scrap trimming blade. In this relationship, the scrap tray and trimming blade will be positioned directly above the pallet P.

The shuttle is shifted to carry the now empty lower die DL back to its loading position where, prior to receiving another clay slug S from loader D, the die is subjected to a dewatering operation to remove excess moisture from the die surface. In performing this, the die is covered with the aforementioned lower die dewatering hood and the moisture is blown from the surface of the die by air jets specifically positioned within the hood to wipe the die surface. The shifting of the shuttle carries the pallet supporting platform with the empty pallet P thereon under the upper die DU. Once aligned beneath the upper die, the pallet P is raised to dispose it immediately beneath the formed ware which is still adhered to the upper die DU. Raising the pallet supporting platform also elevates the scrap trimming blade, extending it through the opening in the scrap tray so that it engages the clay flash on the underside of the upper die DU that surrounds or encircles the pressed ware whereupon the clay flash and pressed ware may be separated with the clay flash being removed as scrap.

At this time, release fluid pressure such as air under pressure is applied across the face of the upper die DU, thereby releasing the formed ware and flash from the upper die. The desired pressed ware settles through the trimming blade and opening in the scrap tray onto the pallet P while the flash settles from the upper die as scrap onto the scrap tray which encircles the trimming blade.

With the pressed ware resting on the pallet P, the pallet is lowered which also effects withdrawal of the trimming blade from the scrap tray opening. In this relation of the parts, after the upper die has been dewatered as described below, the shuttle is again shifted to move the pallet supporting platform and related parts out from under the upper die DU and move the lower die DL which has been dewatered and reloaded with a clay slug, in under the upper die.

Before the next pressing operation is carried out, the dewatering hood for the upper die is passed on its tracks under the upper die DU to remove excess moisture from the die surface. Thereby, the upper die is dewatered by blowing air across the surface thereof to remove purged surface moisture. It may be noted that the dewatering of the dies is important where moisture containing material such as clay is used in that the pressing action will usually express water from the clay as it is formed into the ware, such water being absorbed by the die surfaces. The application of the releasing fluid pressure tends to return this water to the die face blowing water and clay fines onto the surface of the ware and surface of the die. If this excess moisture is not removed between pressing operations, defective ware may be produced with imperfections occurring in the ware surface resulting from water or air blisters, improper release action may result when fluid pressure is applied across the die surface for release, etc.

With the pallet supporting platform disposed out from under the upper die DU, the scrap tray carrying the clay scrap is swung to the position shown in FIGURE 1 where it underlies an air jet nozzle ring. Air jets are then impinged beneath the edges of the ring of scrap, blowing it through the opening in the scrap tray whereupon it falls onto the scrap return conveyor F. This conveyor returns the still soft clay scrap to the pug mill A where it is incorporated with new clay which is extruded and formed into the clay slugs.

The pallet P with the pressed ware thereon is pushed from the pallet supporting platform onto the conveyor G.

WARE PRESS E

In giving a detailed description of the features of the ware press, several sub-combinations, components and assemblies may best be identified and described under separate sub-headings. However, the interaction and co-operation of these various components, assemblies and sub-combinations is such that they co-act to produce an improved and most efficient automatic operation in the production of pressed ware from the clay slugs S which are formed and loaded onto the press in accordance with the procedure and apparatus described hereinabove.

(a) Mounting and actuation of ware press shuttle

The general over-all construction of the ware press may best be understood by reference to FIGURES 1 and 2. As mentioned in the general description above, the press is provided with a shuttle carrying the lower die DL to enable it to be readily loaded and thereafter aligned beneath the vertically movable upper die DU. Considering first the mounting of the shuttle and parts carried thereby on the press, the details are shown more specifically in FIGURES 4, 5 and 6.

The press is formed with a welded framework base 50 which supports a bed block 51 and support members 52 at the outer ends thereof. A cast metal shuttle base 53 is mounted to extend across and be supported on bed block 51 and support members 52, all as clearly shown in FIGURE 1. A cross-section through the shuttle base 53 is shown in FIGURE 6.

The shuttle base 53 is provided on its upper face with a pair of parallel tracks 54 and 55. Each of these tracks is provided with a V-shaped groove extending along the length thereof. Bumper blocks 56 are bolted at the opposite ends of each of the tracks 54 and 55 to be engaged by snubbers mounted on the shuttle as will be described in connection with specfic reference to the structural details of the shuttle.

As will be better understood from the description of the shuttle hereinafter, the tracks 54 and 55 serve to support and guide the shuttle during its shifting movements in operation of the ware press. To lubricate and facilitate shifting of the shuttle relative to the shuttle base 53, each of the tracks 54 and 55 is supplied with oil under relatively low pressure.

Referring again to FIGURE 6, the shuttle base 53 has a cast metal bolster 75 secured to the top of the central portion of the shuttle base. This bolster is important in offering a rigid, essentially non-yieldable base for supporting the ware pressing load when the lower die DL and upper die DU are operated to press the ware. The bolster overlies the central portion of the shuttle base 53 which in turn is solidly supported on bed block 51 carried by welded framework base 50. The bolster 75, while providing solid support for the pressing loads, still permits the shuttle to be readily shifted as needed in the ware pressing operation.

The upper face of the bolster 75 has a network of slots milled therein which are in communication with the oil pipes 61 through bores 78 formed in the bolster.

A shuttle 90 is mounted on the shuttle base 53 to be shiftable between the positions shown in solid lines and phantom lines on FIGURES 4 and 6. This shuttle mounts the lower die DL and the assemblies for trimming and separately removing the pressed ware and scrap from the press. Shuttle 90 is made up of a shuttle plate which has spaced parallel rails on the underside thereof, these rails being positioned to mate with the V-shaped grooves in the tracks 54 and 55 on shuttle base 53. As referred to above, an oil film is distributed along the tracks 54 and 55 to lubricate and facilitate shifting of the shuttle 90 relative to the shuttle base 53.

The shuttle 90 is shifted relative to shuttle base 53 by means not shown in detail herein, since such means forms no part of the instant invention. A complete description and illustration of a suitable mechanism for effecting controlled shifting of shuttle 90 is disclosed in the above referred application Serial No. 116,135. The shifting action of shuttle 90 is effected by an extensible fluid motor 106 shown on FIGURES 5 and 6, the cylinder of such motor being secured to shuttle base 53 and the piston rod being connected to effect shift of the shuttle 90.

The upper surface of bolster 75 and the underside of shuttle 90 are machined to closely mate. Oil is supplied to the network of slots on the face of bolster 75 to form a film which minimizes resistance to sliding of shuttle 90 across the bolster 75. At the same time, the close cooperation of the shuttle with the bolster provides a solid base for the pressing operation. This construction is of particular importance in successful operation of the ware press considering the danger of cracking or otherwise deforming the porous plaster dies should other than a solid base be provided to carry out the pressing operation.

Once the shuttle 90 is shifted to the opposite end of base 53 from that shown in FIGURES 5 and 6, a locking dog 111 is raised by motor 112 with the dog engaging a stop 110 (FIGURE 1) to firmly lock the shuttle with the end of the shuttle as shown in FIGURE 1 and in phantom in FIGURE 6 engaged with bumper blocks 56.

(b) *Mounting and actuation of upper die DU*

The bed block 51 on base 50 also mounts upstanding cylindrical columns 120, a pair of such columns being provided on each side of the shuttle base 53 as shown in FIGURE 5. A platform 121 is mounted on the upper ends of these columns 120 which platform mounts a pair of extensible hydraulic motors 122. Thus, as shown in FIGURE 1, the cylinders of motors 122 are bolted at 123 to the platform 121. The piston rods 124 of the motors extend downwardly through platform 121 and are connected to operate the press platen 125, which carries the upper die DU on the underside of the platen.

Platen 125 has guide sleeves 126 adjacent the corners thereof which slidably engage with the cylindrical columns 120 to guide vertical movements of the platen. It will be appreciated that motors 122 through their piston rods 124 are effective to operate the press platen 125 and thus perform the ware pressing operation when the shuttle 90, carrying the loaded lower die DL, is aligned beneath the upper die as shown in FIGURE 1.

The platen 125 has a series of parallel rods secured to one end thereof, as shown in FIGURE 1. These rods extend downwardly and slidably engage between guides 131 mounted on base 50. A group of appropriately located trippers 132 are mounted between adjacent rods at selected positions to effect timing of various operations to be carried out incidental to raising and lowering of the press platen 125.

Although not specifically shown, it will be understood that appropriate valves or switches to control the desired press operations may be mounted on base 50, each to be engaged by a particular tripper 132 as the platen 125 is raised and lowered. The point at which the particular operation controlled by a specific tripper 132 is initiated or terminated may be readily adjusted by merely adjusting the position of the specific tripper longitudinally of the parallel rods 130.

(c) *Mounting and actuation of die dewatering hoods*

As a consequence of the pressing of ware starting from a moist clay slug or other moist plastic material, the porous dies in most cases will absorb moisture from the clay. Although a limited amount of moisture in the dies is desirable to obtain good release action of the pressed ware from the dies and to obtain the best possible surface on the pressed ware, an excess amount of water is to be avoided. When the dies acquire too much water, release of the pressed ware may be difficult under certain conditions and also the ware is subject to being covered by a layer of water, which water then must be removed by subsequent drying, thereby prolonging the operation of producing the final article. Therefore, when excess moisture accumulates it must be purged or removed from the dies at intervals.

The amount of moisture which can accumulate in a die without adversely affecting its performance will vary to some extent with every die and the operations performed in use of the die. However, in any specific case there are limits to the proper moisture content within which the die will function satisfactorily. The fluid pressure applied across the face of the die to effect release of the pressed ware will return a portion of the moisture within the porous die to its surface. This excess moisture may then be removed after the ware is separated from the die and in some instances this will suffice to keep the die properly moisture conditioned for most effective ware production. The rapidity with which the die surface is treated after ware release to remove this excess moisture will also affect the amount of moisture that can be removed since when the release fluid pressure is terminated the moisture on the die surface will immediately commence to be absorbed back into the die surface by capillary action.

If for a specific die and pressing operation the moisture expelled incident the ware release and thereupon removed from the die still permits an excess build-up of moisture in the die, purging pressure may be maintained across the face of the die after the ware has been separated therefrom. This purging pressure will expel more moisture from the die which may be removed to maintain the moisture condition of the die within the proper limits for the specific die and pressing operation being carried out.

Where a plastic material containing moisture such as water is being used the apparatus of the instant invention provides die dewatering hoods which are employed to maintain the moisture condition of the dies within the proper limits for most effective ware production. The mounting and construction of the die dewatering hoods is illustrated in FIGURES 1, 3 and 4.

The lower die DL faces upwardly. In the loading position, the upwardly facing surface of the die is exposed. To remove the excess surface moisture, the dewatering hood 140 for the lower die is mounted to be shifted horizontally from a position where the lower die is exposed to receive a clay slug from the slug loader D to a position where it overlies the loading position of the lower die DL. The hood 140 has a pan-like configuration which is open at its underside and has an outlet 141 through which air and moisture exit. The hood has a nozzle manifold (not shown) mounted therein which is connected by a pipe 142 to an air hose 143. The air nozzles on the manifold are specifically arranged to jet air downwardly against particular locations on the face of the lower die DL, whereby moisture is driven from the face and entrained in the air which exits through outlet 141. The particular arrangement of the nozzles for directing the air jets will vary with each die surface configuration and must be disposed to take into consideration the specific contour of the die surface from which the excess moisture is to be removed.

Parallel tracks 145 are mounted to extend above the loading position of the lower die DL. The hood has rollers 146 which engage with tracks 145 so that the hood is suspended from the tracks and movable generally horizontally from a dewatering position whereat it overlies the lower die DL to a retracted position, as shown in FIGURE 3. Thus the tracks 145 are constructed such that as the hood is shifted to its dewatering position closely overlying the lower die DL the air jets may be most effective in removing the surface water. A suitable extensible fluid motor 147 is connected to the hood at 148 with the cylinder thereof mounted above tracks 145 on a support 149 to effect shifting of the hood at the proper time to effect dewatering.

To dewater the upper die DU, a dewatering hood 154 similar to hood 140 is mounted on platform 121 by a framework 150 which carries inclined tracks 151. These tracks terminate adjacent the upper position of platen 125 and are constructed to mate with parallel tracks 135 carried on the underside of platen 125, at the opposite ends of upper die DU.

The hood 154 and hood 140 are generally similar, both having an open pan-like configuration. A nozzle manifold 155 is mounted within the hood having nozzles 156 to form fan-like air jets directed outwardly through the open face of the hood. Air is supplied to the nozzle ring through pipe 157 from a flexible hose connected thereto. The hood 154 has an air and moisture outlet 158 similar to the outlet 141 of hood 140.

The configuration of the nozzle manifolds in the hoods 140 and 154 and the positioning of the nozzles thereon, such as nozzles 156 on manifold 155, are particularly important in their relationship to the press dies to remove excess moisture from the die surfaces. By reference to the nozzle positioning shown with respect to hood 154 it may be pointed out that nozzle 155 will expel fan-like jets of air which will impinge against the die with which the hood cooperates. These fan-like jets are so disposed relative to the configuration of the particular article being pressed, i.e., a tank cover, that the jets will effectively sweep the die surface to remove moisture from corners and cervices of the die as well as planar surfaces. The directing of the air jets is important with respect to each different set of dies employed with the press. Thus, the configuration of the manifold which determines the arrangement of the nozzles, the particular positioning of nozzles on the manifold in relation to jets from adjacent nozzles and in relation to the die contours are all factors which must be considered in constructing nozzle manifolds for the hoods to be used with a particular set of dies, since the die contours to be accommodated in removing die surface moisture have an important bearing on how the air jets should strike the die surface to remove this moisture.

Rollers 160 are mounted on the ends of the hood 154 disposed to engage with tracks 151 and tracks 135 as best shown in FIGURE 4. An extensible fluid motor 165 is supported on the framework 150 with the piston rod connected through a suitable linkage 166 to extend and retract the dewatering hood 154.

With the press platen 125 in its raised position as shown in FIGURES 1 and 4, the motor 165 is operated to extend the hood 154 with rollers 160 moving down inclined tracks 151 and into the horizontal tracks 135 carried on the underside of platen 125. This positions the hood beneath the upper die DU where the air jets from nozzle manifold 155 impinge upon the downwardly facing surface of the die to blow off excess moisture which exits through outlet 158. Thereafter, the motor 165 is again operated to retract the upper dewatering hood 154 to the position as shown in FIGURES 1 and 4.

*(d) Mounting and actuation of scrap trimming and separate pressed ware and scrap removal assemblies on shuttle*

The lower die DL is bolted at 170 adjacent one end of shuttle 90 so that when the shuttle is shifted to the position shown in FIGURE 1 and locked by engagement of dog 111 with stop 110, the upper and lower dies will be vertically aligned to carry out pressing of the ware from a clay slug S previously loaded onto the lower die. The other end of the shuttle 90 carries assemblies for receiving and removing the pressed ware when it is released from the under surface of the upper die DU, for trimming the clay flash from the pressed ware and for removing the flash as scrap separate from the pressed ware. The structure for handling the pressed ware and scrap is best shown in FIGURES 1, 4, 5, 6, 7 and 8.

A pallet supporting platform 175 rests on the upper surface of shuttle 90. This platform has spaced parallel side rails 176 secured on the upper face thereof between which is positioned the pallet P to receive the ware and be employed in handling its removal from the press. The underside of platform 175 is provided with four sockets 177 which are received in the bores 178 formed in the shuttle 90. These sockets 177 each have a bore 179 which is engaged in the raising and lowering of the platform as described below. In its normal position, platform 175 rests on shuttle 90 with the sockets 177 engaged in bores 178 as shown in FIGURE 4.

When the ware is to be released from upper die DU and the scrap trimmed and removed therefrom, in the illustrated embodiment the pallet P is raised to dispose it immediately beneath the upper die so that upon being released, the pressed ware will have only a small distance to settle from the upper die onto the pallet P. To raise the pallet P, the platform 175 is lifted by four lifting pins 180 which are mounted in bushings 181 to extend downwardly through the bed block 51 and be elevated and retracted at the proper times to engage with bores 179 in the sockets 177 and raise and lower the platform 175. The lifting pins 180 have reduced diameter ends 182 which mate with bores 179 in sockets 177 to insure proper operation in the raising and lowering of the pallet supporting platform. The operation of raising and lowering lifting pins 180 may be effected by suitable motor means (not shown) mounted in the base 50 below bed block 51. The pins 180, as shown more clearly in FIGURE 6, are disposed outwardly of the shuttle base 53 such that in their retracted condition they do not interfere with shifting of the shuttle 90 as effected by motor 106.

A scrap removal tray 185 is mounted on the platform 175 by three mushroom headed pins 186 which slidably engage with sleeve bushings 187 affixed to the upper surface of platform 175. These pins are disposed at three of the four corners of tray 185 as shown in FIGURE 5.

Tray 185 has a central opening 188 (FIGURE 5) conforming generally to but slightly larger than the peripheral contour of the pressed ware W. Also apertures 189 are provided in tray 185 to accommodate upper limit studs on the scrap trimming assembly.

As shown in FIGURE 7, the fourth corner of the scrap tray 185 is supported by a spline shaft 190 mounted on the underside of tray 185 by a flange on the shaft engaged by cap screws 191. The spline shaft 190 slidably engages with an internally splined sleeve 192 which in turn is rotatably mounted in a bushing 193 secured to the pallet supporting platform 175. The sleeve 192 has a pinion 194 secured thereto by cap screws 195. A ring 196 encircles the upper end of sleeve 192 and is flush therewith to form a stop for the flange on spline shaft 190 when the platform 175 is raised and, during such upward movement, picks up the scrap tray 185.

Each of the mushroom headed pins 186 and the spline shaft 190 extend through the platform 175 and rest on the upper surface of the shuttle 90. These pins and the spline shaft are thus slidable relative to platform 175 such that as the platform is raised by the action of lifting pins 180, the tray 185 initially remains stationary until the head of pins 186 and bushings 187 and the flange on shaft 190 and ring 196 move together. Thereafter, the tray 185 moves up with platform 175 with the parts in the position shown in FIGURE 8.

A rack 198 is mounted to engage with pinion 194 with movement of the rack being guided by an angle member 199 secured to platform 175. The rack is connected to the piston rod of an extensible fluid motor 200 with the cylinder of such motor secured to the platform 175. The operation of motor 200 by driving rack 198 is thus effective through pinion 194, sleeve 192 and splined shaft 190 to swing the scrap tray 185 as is done in pivoting the tray for removal of the scrap therefrom. It will be appreciated that the splined shaft and internally splined sleeve may be replaced with other means to effect pivoting movements of the tray, one such alternative being the use of a square shaft slidably received within a square bore sleeve with roller bearings mounted within the sleeve bore to promote sliding movement of the square shaft within the bore.

The pallet supporting platform 175 also carries a scrap trimming blade 205 which is mounted in a holder 206. Holder 206 has an inner opening with the blade 205 secured to the perimeter of this opening. Although shown with a somewhat sharpened upper edge to effect a distinct severing of the flash clay from the pressed ware, blade 205 under some conditions may have a blunt edge whereby the flash is pressed against the upper die and the flash in effect torn from the pressed ware when the ware is released.

The formation of the holder opening and blade affixed thereto is such that the blade embraces an area corresponding to the periphery of the particular pressed ware to be produced. In the illustrated embodiment, the suggested pressed ware being a toilet tank cover, the blade 205 has a configuration corresponding to the desired external configuration of the tank cover as shown in FIGURE 5. The opening 188 in the scrap tray 185 is such that the blade 205 can pass therethrough without striking the tray and engage with the flash clay on the underside of the upper die DU to trim away the flash from the pressed ware in the manner as shown in FIGURE 8.

The holder 206 has outwardly extending support arms 207. Each of these arms has an internally threaded bore with a stud 208 provided with a lock nut 209 threaded into the upper end thereof. These studs in the scrap trimming operation pass upwardly through the openings 189 in the scrap tray 185 and engage with the underside of the frame of the upper die DU as shown in FIGURE 8 to limit upward movement of blade and thereby avoid undue pressure of the blade 205 against the underside of the die. By appropriate adjustment of the lock nuts 209, the proper degree of engagement of the blade 205 with the flash clay on the undersurface of the upper die DU can thus be achieved.

The lower ends of the threaded bores in arms 207 are provided with headed studs 210 which extend downwardly and slidably engage in sockets 211 fastened on the platform 175. A spring 212 is disposed between the platform 175 and the underside of each arm 207 to normally urge the blade 205 and holder 206 upwardly such that the heads of studs 210 are seated in the sockets 211. In this state, the blade and holder assume a position relative to platform 175 as shown in FIGURES 4, 6 and 7.

In the light of the above-described structure, the functioning of the assemblies for removing the pressed ware from the upper die for trimming the flash scrap clay from the ware and for removing the scrap separate from the ware may be described.

Assuming the shuttle 90 positioned as shown in FIGURE 6 and the platform 175 having an empty pallet P positioned thereon between rails 176, the platform will be resting on the shuttle 90 and the scrap tray 185 and trimming blade 205 disposed as shown in FIGURE 6. Thereupon the lifting pins 180 are elevated from bed block 51 to engage with sockets 177 on the platform 175 thereby raising the platform. During initial raising movement of the platform, the scrap tray 185 will remain stationary since it is supported on pins 186 and splined shaft 190 which are slidable relative to platform 175 and rest on the upper surface of shuttle 90.

The blade 205 on holder 206 is carried upwardly with platform 175 by reason of springs 212 biasing it to its elevated position above the platform. By this action, the scrap tray 185 is lowered relative to platform 175 to a point such that the blade 205 extends through opening 188 in the tray. When the studs 208 on blade holder 206 engage the underside of the upper die frame, further upward movement of the blade 205 is prevented. However, before this occurs, the blade will have moved upwardly to sever the flash clay around the perimeter of the pressed ware or with a blunt-edged blade press the flash up against the upper die to hold it while the pressed ware is released. Further upward movement of platform 175, as pins 180 continue to rise, will result in compressing the springs 212 while the pallet P is raised closer to the pressed ware to receive it from the under face of the upper die DU. Release pressure is then applied internally of the upper die to release the pressed ware W as well as the flash from the die surface on which it has been retained. The ware W thereupon drops onto the empty pallet P with the flash falling as scrap onto the scrap tray 185 which surrounds the trimming blade 205 in the relation as shown in FIGURE 8. With a blunt-edged blade 205 the weight of the pressed ware may be relied upon to tear the flash from the ware since the flash is held against the upper die by the blade during release of the ware.

The lifting pins 180 are then retracted to lower the platform 175 back down to rest on shuttle 90. During this lowering movement, the blade 205 in holder 206 and the scrap tray 185 are returned to their positions relative to platform 175 as shown in FIGURE 7, with the scrap resting on the tray 185. At this point, the shuttle may be shifted by operation of motor 106 and thereafter the scrap removed from tray 185 and ware carrying pallet P removed and replaced by an empty pallet P. It will be appreciated that instead of raising the pallet, scrap trimming blade, etc., the upper die may be lowered to effect the trimming and/or for release of the ware onto the pallet.

With the scrap disposed on tray 185, and the platform 175 lowered so that the parts are returned as shown in FIGURE 13 with the pallet P having the ware W resting thereon, the shuttle 90 is shifted by operation of motor 106 to the position as shown in FIGURE 1. In this position, the scrap tray 185 and pallet supporting platform 175 are removed from beneath the upper die DU.

Motor 200 is then operated such that rack 198 pivots the scrap tray 185 through pinion 194 and splined shaft 190 connected to the scrap tray. In this pivoting movement, the tray 185 slides across the mushroom headed pins 186 and across a series of arcuately spaced rollers 220. Thee rollers are supported on an arcuate rail 221 which in turn is mounted on suitable support legs. A guard rail 223 may also be provided supported on the legs and disposed to enclose the outermost swinging path of movement of the scrap tray 185.

The scrap tray 185 is swung through an arc of 180° to a point where it lies beneath an air jet nozzle manifold 225. This manifold is mounted on the underside of a rectangular frame 226 which is supported from a suitable stanchion 227. In this position of the scrap tray 185 with the air jet nozzle manifold 225 disposed thereabove and with the opening 188 of the scrap tray overlying the scrap return conveyor F, air is supplied to the air jet nozzles on manifold 225 from a suitable air pressure line. The jets of air from nozzle manifold 225 impinge on the upper surface of the scrap tray 185 immediately outwardly of the edges of the ring of scrap to pass inwardly beneath the edges of the scrap ring and lift it on a layer of air. The inward movement of the air jets blows the ring of scrap clay material toward the center of the tray where the air passes down through opening 188 and the scrap falls through the opening 188 and onto conveyor F. Thereafter, motor 200 is again operated to return tray 185 across rollers 220 and back onto the mushroom headed pins 186 to reposition the tray for the next operation of removing scrap.

Also, while the shuttle is positioned as shown in FIGURE 1 the pallet feeder L operates to push an empty pallet P between the side rails 176 and onto the pallet supporting platform 175. This operation pushes loaded ware carrying pallet P off the platform 175 and onto conveyor G which carries the pallet with the ware thereon from the press.

The structural details of the scrap return conveyor F and conveyor G need not be specifically described since they form no part of the instant invention, although the conveyors do cooperate in the overall apparatus to render the ware production continuous and automatic. A variety of appropriate conveyor constructions may be employed as desired with conventional conveyor structures being shown as are employed in the apparatus of FIGURE 3.

SPECIFIC WARE PRESS OPERATION

The loader D moves the slugs S one at a time to charge the lower die DL of the ware press. The shuttle 90 on the ware press E is moved to position the lower die DL as shown in FIGURE 4 and loader D loads the die dropping a slug S through chute 46.

Thereupon motor 106 is operated to shift the shuttle 90 to the position shown in FIGURE 1 whereat the lower die DL is positioned directly beneath the upper die DU. Once shifted the dog 111 is raised by motor 112 to engage locking stop 110. This positively locks the shuttle in position which is important when the dies are closed and the extreme pressure applied to press the ware.

In this relation the motors 122 are supplied with hydraulic fluid to drive the press platen 125 down whereupon the clay slug S is formed into the shape of the die cavity which in the instant example corresponds to the configuration of a tank cover. After completing the pressing operation, the press platen 125 is raised by motors 122. Before raising the platen to separate the upper and lower dies, release pressure is applied through the porous lower die DL so that the pressed ware will be released from the lower die and will move upwardly, retained on the underside of the upper die DU. It will be appreciated that any flash clay surrounding the pressed ware will also be released from the lower die and be retained on the upper die.

The locking dog 111 is retracted by motor 112 to release the shuttle. The shuttle 90 is again shifted by operation of motor 106 to return it to the position as shown in FIGURE 4.

With the shuttle positioned as shown in FIGURE 4 the lifting pins 180 are elevated to raise the platform 175 along with the trimming blade 205 and scrap tray 185. The parts are thus raised to assume a position as shown in FIGURE 8 resulting in the blade 205 severing the scrap from the desired pressed ware W whereupon release pressure is applied to the porous upper die DU and the ware W settles onto the empty pallet P while the flash is released as scrap onto scrap tray 185.

The lifting pins 180 are then lowered returning the platform 175 to rest on the pallet 90. The scrap and ware W are now separated in the manner as shown in FIGURE 7.

While the ware W and scrap are being separated and released from the upper die DU, the dewatering hood 140 for the lower die is shifted by operation of motor 147 to overlie the lower die DL which die is then in the loading position. With the hood 140 so positioned, air is applied through the air jets in the hood 140 to blow off and carry away excess moisture from the surface of the lower die. If more moisture need be removed to maintain proper moisture condition of the die, a purging pressure may be applied after the ware release pressure is terminated. Upon completion of this operation the motor 147 is again operated to retract the dewatering hood 140. The lower die DL is now in condition to receive another clay slug and accordingly motor 44 on loader D operates to drop another slug through chute 46 thereby loading the die DL.

The shuttle 90 is again shifted by motor 106 and locking dog 111 operated by motor 112 to lock the shuttle in position. Before undertaking the next pressing operation, the dewatering hood 154 for the upper die is extended by operation of motor 65 to dispose the hood beneath upper die DU. Air jets are then jetted from nozzle ring 155 against the under surface of the upper die DU to remove excess moisture from the die surface. As mentioned in connection with dewatering the lower die, a purging pressure may be applied to the upper die after the release pressure is terminated if the die condition calls for removal of a greater amount of moisture. Dewatering hood 154 is thereafter retracted by motor 165 and the pressing operation commenced by moving press platen 125 down to form the ware from the most recently placed slug of clay in the lower die DL.

During this second pressing operation, the scrap previously removed and now resting on tray 185 is cleared from the tray by operating motor 200 which pivots the tray across the series of rollers 220 to position it beneath air jet ring 225. Air under pressure is applied to ring 225 and the air jets lift the scrap ring and blow it inwardly and down through the center opening 188 of tray 185 whereupon it falls onto scrap return conveyor F. This conveyor carries the scrap back to the pug mill A dumping it in with the clay being kneaded by screw 11 in the open trough 10.

At the same time the pallet feeder L operates to push an empty pallet P onto platform 175 while the ware loaded pallet is pushed off of the platform onto conveyor G. With an empty pallet on platform 175 and the scrap tray cleared and returned by operation of motor 200, the mechanism is ready to perform the next operation of removing and separating the ware and scrap which has been produced by a second pressing operation. It will thus be appreciated how this sequence of operations may be carried out in accordance with timed operation of the various components to produce in a continuous manner pressed ware free of flash scrap material.

The loaded pallet is carried on conveyor G and the ware exposed to a drying operation whereafter the pallet and ware are separated, the ware then being given a final trimming, glazed, and fired.

Many variations and modifications of the present invention will occur to those skilled in the art from a study of the invention modification specifically disclosed herein. All such variations and modifications which come within the spirit and scope of the appended claims are intended to be included herein as fully and completely as if they had been specifically illustrated, described and claimed. Thus the modification specifically disclosed is exemplary only and not intended to be limiting on the scope of the invention.

What is claimed is:

1. In a press for producing pressed ware in a substantially trimmed scrap-free state, the combination of relatively reciprocable upper and lower dies cooperable to form ware from plastic material, a scrap trimming member having an edge defining an opening corresponding substantially to the peripheral configuration of the pressed ware to be produced, means mounting said member relative to said upper die to be engaged with the downwardly facing pressing surface of said upper die when said dies are separated, means for retaining the formed ware and scrap encircling the ware on said surface of said upper die and for releasing the ware and scrap therefrom, said edge of said member pressing the formed plastic material against the downwardly facing pressing surface of said upper die along an area encircling the desired formed ware such that upon release of the ware from said surface the ware and scrap will be separated preparatory to their removal from the press.

2. In a press, the combination recited in claim 1 wherein said mounting means for said member includes a support carrying said scrap trimming member, said support being elevatable to move said edge of said member into engagement with the downwardly facing pressing surface of said upper die.

3. In a press for producing pressed ware in a substantially trimmed scrap-free state, the combination of relatively reciprocable upper and lower dies cooperable to form ware from plastic material, a scrap trimming member having an edge defining an opening corresponding substantially to the peripheral configuration of the pressed ware to be produced, a support carrying said scrap trimming member, said support being mounted to be movable horizontally from a first position disposed laterally of the path of reciprocation of said dies to a second position disposed in such path of reciprocation when said dies are separated, means for retaining the formed ware and scrap encircling the ware on said surface of said upper die and for releasing the ware and scrap therefrom, means for moving said support and said upper die toward each other when disposed in said second position to move said edge of said member into engagement with the downwardly facing pressing surface of said upper die to thereby press the excess plastic material against said surface along an area encircling the pressed ware such that upon freeing the ware from said upper die the ware and scrap will be separated preparatory to their removal fom the press.

4. In a press for producing pressed ware in a substantially trimmed scrap-free state, the combination of relatively reciprocable upper and lower dies cooperable to form ware from plastic material, a scrap trimming member having an edge defining an opening corresponding substantially to the peripheral configuration of the pressed ware to be produced, a support carrying said member and mounted to be movable from a first position disposed laterally of the path of reciprocation of said dies to a second position disposed in such path of reciprocation when said dies are separated, means for elevating said support when disposed in said second position to move said edge of said member into engagement with the downwardly facing pressing surface of said upper die, means for retaining the formed ware and scrap encircling the ware on said surface of said upper die and for releasing the ware and scrap therefrom, said edge of said member pressing the formed plastic material against said upper die along an area encircling the desired formed ware such that upon release of the ware from said surface the ware and scrap will be separated preparatory to their removal from the press.

5. In a press for producing pressed ware in a substantially trimmed scrap-free state, the combination of relatively reciprocable upper and lower dies cooperable to form ware from plastic material, a scrap trimming member having an edge defining an opening corresponding substantially to the peripheral configuration of the pressed ware to be produced, a support mounting said member and having a scrap tray thereon independent of said trimming member and generally surrounding the area enclosed by said opening, means for raising said tray above the edge of said trimming member, said support being mounted to permit engagement of said edge with the downwardly facing pressing surface of said upper die when said dies are separated, means for retaining the formed ware and scrap encircling the ware on said surface of said upper die and for releasing the ware and scrap therefrom, said edge of said member pressing the formed plastic material against the downwardly facing pressing surface of said upper die along an area encircling the desired formed ware such that upon release of the ware from said surface the ware will pass through said opening of said scrap trimming member and the scrap will be deposited on said tray for their removal separately from the press.

6. In a press, the combination recited in claim 5 wherein said support is mounted to be movable from a first position disposed laterally of the path of reciprocation of said dies to a second position disposed in such path of reciprocation when said dies are separated, and means are provided for elevating said support when disposed in said second position to move said edge of said member into engagement with the downwardly facing pressing surface of said upper die.

7. In a press for producing pressed ware in a substantially trimmed scrap-free state, the combination of relatively reciprocable upper and lower dies cooperable to form ware from plastic material, a support platform mounted to be movable from a first position disposed laterally of the path of reciprocation of said dies to a second position disposed in such path of reciprocation when said dies are separated, a scrap trimming member carried by said platform and having an edge defining an opening corresponding substantially to the peripheral configuration of the pressed ware to be produced, a scrap tray generally surrounding the area enclosed by said opening, means for retaining the formed ware and scrap encircling the ware on said surface of said upper die and for releasing the ware and scrap therefrom, said member and said upper die being relatively movable to bring said edge of said member into engagement with the downwardly facing pressing surface of said upper die to thereby press the formed plastic material against said upper die along an area encircling the desired formed ware such that upon release of the ware from said surface the ware will pass through said opening onto said platform and the scrap will be deposited on said tray for their removal separately from the press.

8. In a press, the combination as recited in claim 7 wherein means are provided for elevating said support platform when disposed in said second position to move said edge of said member into engagement with the downwardly facing pressing surface of said upper die.

9. In a press, the combination as recited in claim 7 wherein said scrap tray and said scrap trimming member are relatively vertically movable to project said member through an aperture in said tray, said scrap tray being pivotal relative to a vertical axis to effect removal of the scrap deposited thereon from beneath said upper die.

10. In a press, the combination as recited in claim 9 wherein means are connected to effect pivotal movement of said scrap tray to a position out from beneath said upper die, and air jet means are mounted above the outer pivoted position of said scrap tray disposed to direct jets of air beneath the scrap on said tray to float it through the tray aperture in clearing the tray of scrap.

References Cited by the Examiner

UNITED STATES PATENTS

| 1,637,708 | 8/1927 | Porter | 25—27 |
| 1,993,047 | 3/1935 | Westman | 25—156 |
| 2,014,269 | 9/1935 | Barbour | 25—156 |
| 2,132,788 | 10/1938 | Hunt | 264—161 |
| 2,295,090 | 9/1942 | Knight | 83—914 |
| 2,382,655 | 8/1945 | Nichols. | |
| 2,615,111 | 10/1952 | Paquette et al. | |
| 2,672,669 | 3/1954 | Davis. | |
| 2,680,893 | 6/1954 | Glaab | 25—57 |
| 2,733,493 | 2/1956 | Bryer | 25—129 |
| 2,896,555 | 7/1959 | Marcus | 107—1 |

J. SPENCER OVERHOLSER, *Primary Examiner*.

ROBERT F. WHITE, ALEXANDER H. BRODMERKEL, *Examiners*.